United States Patent [19]
Fallu

[11] Patent Number: 5,819,896
[45] Date of Patent: Oct. 13, 1998

[54] VARIABLE FLOW RATE TORQUE CONVERTER LOCKUP CLUTCH

[75] Inventor: John William Fallu, Taylor, Mich.

[73] Assignee: Ford Motor Company, Dearborn, Mich.

[21] Appl. No.: 739,074

[22] Filed: Oct. 28, 1996

[51] Int. Cl.⁶ .............................. F16H 45/02; F16D 13/72
[52] U.S. Cl. .............. 192/3.29; 192/107 R; 192/113.36; 192/113.35
[58] Field of Search .................................... 192/3.29, 3.3, 192/107 R, 113.35, 113.36

[56] References Cited

U.S. PATENT DOCUMENTS

| | | | |
|---|---|---|---|
| 4,995,500 | 2/1991 | Payvar | 192/107 R |
| 5,056,631 | 10/1991 | Macdonald | 192/3.29 |
| 5,501,309 | 3/1996 | Walth et al. | 192/3.29 |
| 5,566,802 | 10/1996 | Kirkwood | 192/3.29 |

*Primary Examiner*—Richard M. Lorence
*Attorney, Agent, or Firm*—Roger L. May; Frank G. McKenzie

[57] ABSTRACT

A lockup clutch for a torque converter (10) has a piston (63) with a tapered face (67) that engages a grooved friction material (61). The edge (71) of the piston face (67) extends outward away from the center portion (69) of the piston face (67) toward the friction material (61). The friction material (61) is arranged in a pattern of concentric lands (80, 82, 84) defining annular grooves (86) between adjacent lands with an innermost land (82) being free of radial grooves (92) and all other lands being connected by radial grooves (92) in communication with the interior of the torque converter housing (12, 14) through the torus circuit cavity. The innermost land (82) blocks fluid flow from the torus flow circuit cavity when the piston (63) engages the disk (61) in a hard lockup condition but permits fluid flow during a soft lockup condition.

10 Claims, 2 Drawing Sheets

5,819,896

VARIABLE FLOW RATE TORQUE CONVERTER LOCKUP CLUTCH

FIELD OF THE INVENTION

This invention relates generally to a torque converter having an impeller and a turbine, and, more particularly, to a lockup clutch for the torque converter having a clutch plate piston that engages a friction surface in the impeller housing. The piston and friction surface establish a friction driving connection between the impeller and turbine when the pressure differential across the clutch plate is sufficient to establish a clutch engaging force.

BACKGROUND OF THE INVENTION

A torque converter transaxle typically includes a torque converter that has an impeller and turbine. The housing for the impeller includes a lockup clutch assembly that uses a clutch plate friction surface to engage a friction material on the impeller housing. The clutch plate and friction material establish a frictional driving connection between the impeller and the turbine when the pressure differential across the clutch plate is sufficient to establish a clutch engaging force. The clutch plate is usually connected through a damper assembly to the hub of the turbine thereby establishing a mechanical torque transfer between an engine crankshaft and the turbine which bypasses the torque flow path through the torque converter.

When the clutch is allowed to slip continuously rather than engaging to establish a full lockup condition, heat is generated and must be dissipated. The heat tends to cause instability of the clutch because the grooved friction surfaces of the friction material tend to distort. The surface of the friction material contains a pattern of grooves allowing fluid to flow through the clutch during contact of the clutch plate friction surface and the friction material for cooling. Unfortunately, the through groove pattern uses fluid even during hard lockup which is considered a converter fluid loss requiring higher capacity pumps to maintain converter fluid flow. Accordingly, it will be appreciated that it would be highly desirable to have a torque converter lockup clutch assembly that provides adequate cooling flow through the friction material during soft lockup but blocks flow during converter hard lockup thereby minimizing a need for higher capacity pumps.

SUMMARY OF THE INVENTION

The present invention is directed to overcoming one or more of the problems set forth above. Briefly summarized, according to one aspect of the present invention, a torque converter has an impeller housing enclosing a turbine and impeller. A lockup clutch for the torque converter comprises a clutch plate, an annular friction disk and a friction material attached to the disk. The clutch plate, located in the housing, has one end portion connected to the turbine and a distal end portion forming a piston. The piston has a face with a friction surface and contains a center portion and an edge portion. The annular friction disk is attached to an interior portion of the housing. The clutch plate and the friction disk define a control pressure chamber, and the housing defines a torus circuit cavity. Friction material is disposed on the annular friction disk for contacting the piston face. The friction material is arranged in a pattern of concentric lands defining annular grooves between adjacent lands with an innermost land being free of radial grooves and all other lands being connected by radial grooves communicating with the interior of the housing through the torus circuit cavity. The innermost land blocks fluid flow from the torus flow circuit cavity when the piston engages the disk in a hard lockup condition but permits fluid flow during a soft lockup condition.

Tapering the piston allows fluid flow during soft lockup conditions where the innermost land does not contact the piston face. Raising the edge portion of the piston face away from the center portion of the piston face causes the edge portion to taper outward away from the center portion. The edge portion tapers outward away from the center portion at an angle in a range of about ½° to about 1½° with a tapered of about ¾° being optimal.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
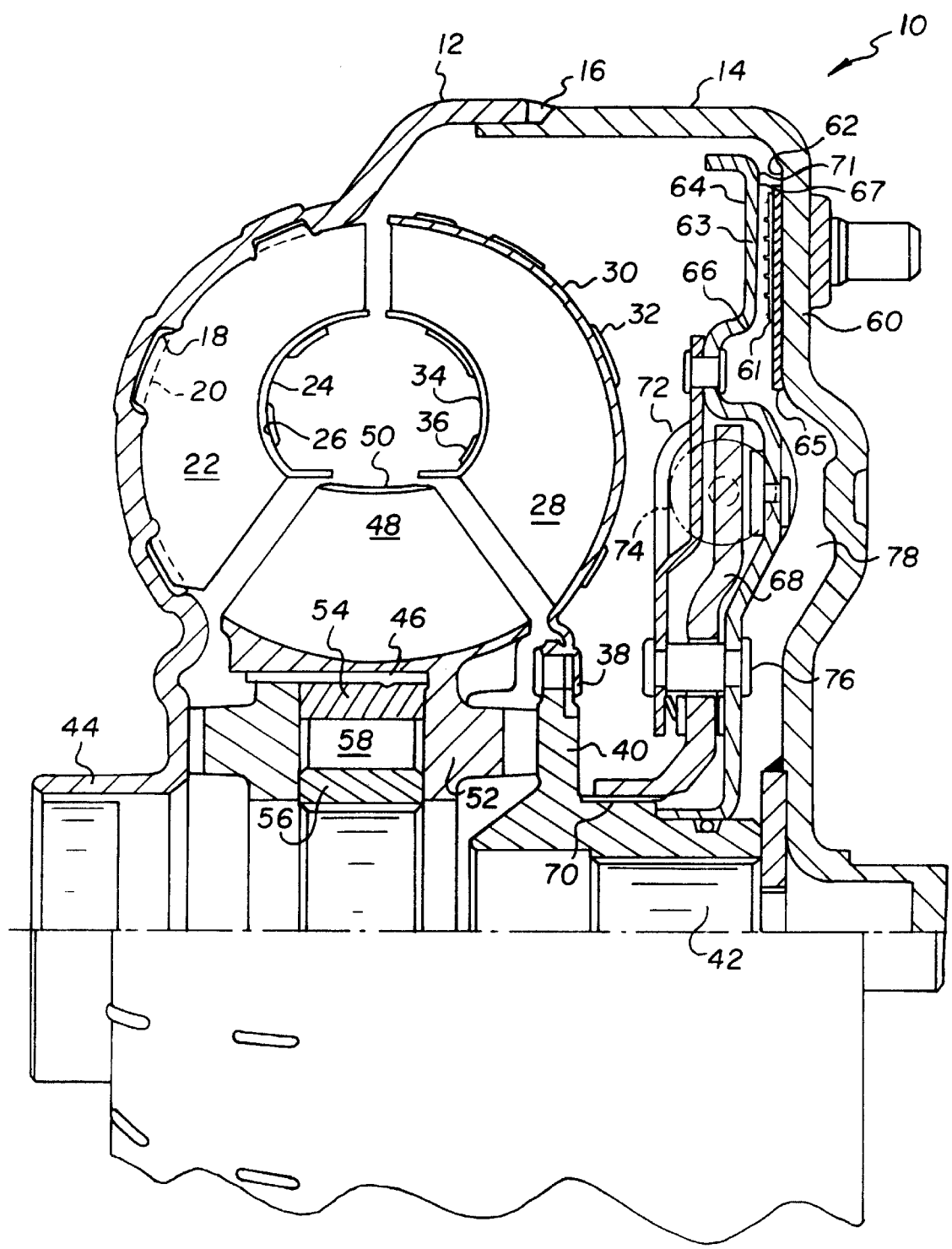
FIG. 1 a simplified sectional view of a preferred embodiment of a torque converter incorporating a clutch assembly with a tapered piston and grooved disk according to the present invention.
Figure 2:
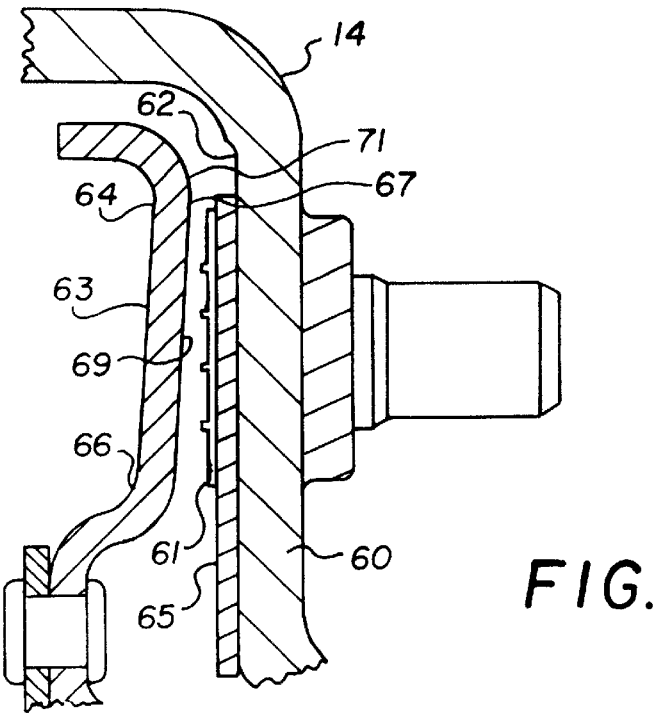
FIG. 2 is an somewhat enlarged view of the tapered piston of FIG. 1.
Figure 3:
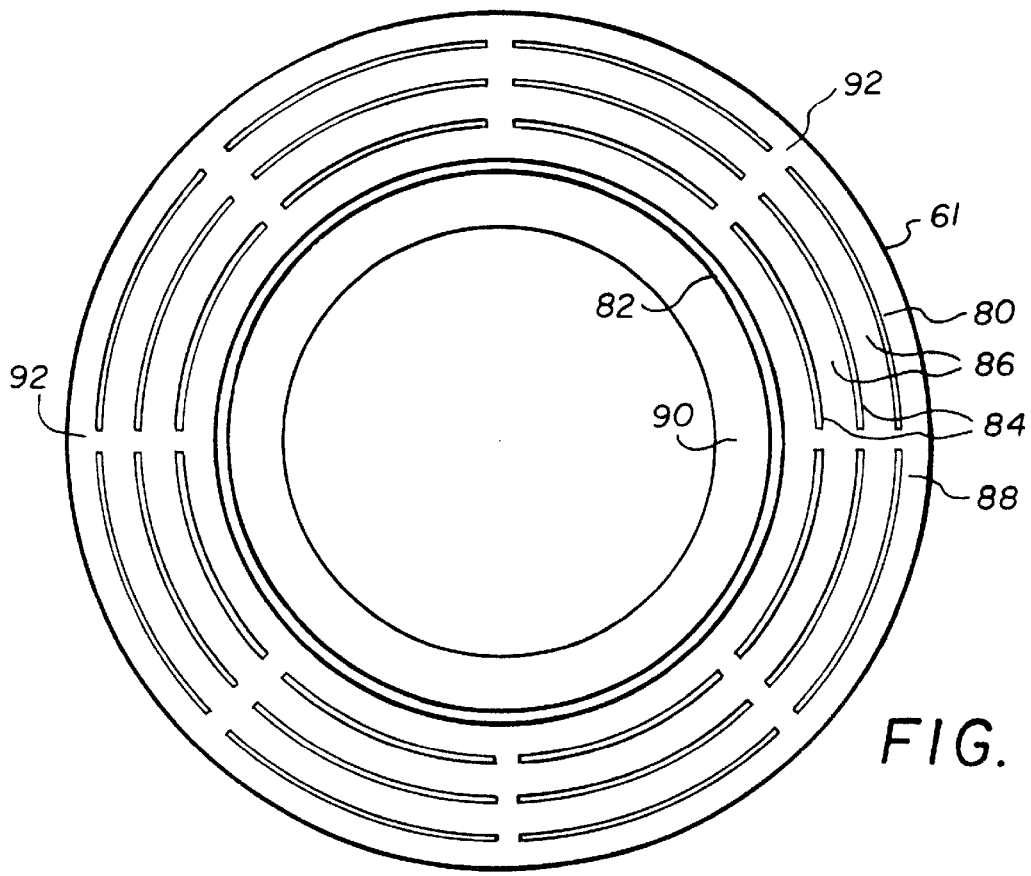
FIG. 3 is a view of the disk of FIG. 1 illustrating the groove pattern.

Referring to FIGS. 1–3, a torque converter 10 has an impeller housing 12 and an impeller housing cover 14. The housing 12 is joined at its outer edge to the cover 14 and fastened thereto by weld 16. The housing 12 has recesses 18 that receive tabs 20 on radial outflow impeller blades 22. An inner impeller shroud 24 has circumferentially spaced apertures that receive tabs 26. The blades 22 are thus retained between the housing 12 and the inner shroud 26. Impeller housing 12 has a hub 44 that is adapted to be journalized on a stationary sleeve shaft that forms a part of the transmission housing.

Turbine blades 28 are arranged in juxtaposed radial inflow disposition with respect to the blades 26. The turbine blades 28 are retained by a turbine housing 30 that has apertures to receive tabs 32 formed on the turbine blades 28. A circular inner turbine shroud 34, similar to impeller shroud 24 has slots that receive tabs 36 on the inner edge of the blades 28. Thus the blades 28 are held together to define radial inflow passages that are part of a torodial fluid flow path. The radially inward portion of the turbine housing 30 is secured by rivets 38 to the turbine hub 40 which has internal splines 42 to permit a driving connection with a turbine shaft.

Bladed stator assembly 46 includes stator blades 48 disposed between the flow exit section of the turbine and the flow entrance section of the impeller. An inner stator shroud 50 surrounds the radially outward ends of the stator blades 48. A stator hub 52 carries the stator blades 48. An outer overrunning brake race 54 is secured within an opening in the hub 52. An inner overrunning brake race 56 has internal splines to permit a connection with the aforesaid stationary sleeve shaft. Overrunning clutch roller elements 58 establish a one way braking action between the races with the outer race being cammed to cooperate with the individual roller elements.

Impeller housing cover 14 has a radially extending portion 60 at its outer edge. The inner surface 62 of the radially extending portion 60 carries a friction material 61 to be engaged by the piston 63 formed by radially outward portion 64 of clutch plate 66. The friction material is preferably bonded to a disk 65 which is attached to the radially extending portion 60. The clutch plate 66 is adapted to be connected to turbine hub 40 by a damper assembly.

The damper assembly has a driven plate 68 splined at 70 to the turbine hub 40. A cover plate 72 of the damper assembly cooperates with the clutch plate 66 to define an enclosure for tangentially disposed damper springs 74. These are arranged in spring pockets formed in the outer portion of the driven plate 68. Torque is transmitted from the clutch plate 66 to the driven plate 68 through the tangentially disposed springs 74. Spacers 76 join the cover plate 72 with the clutch plate 66 and extend through slotted openings formed in the driven plate 68 to permit limited axial displacement of the drive plate 66 with respect to the driven plate 68.

The chamber 78 defined by the impeller housing cover 14 and clutch plate 66 is a control pressure chamber which communicates with a control pressure source. By controlling the pressure in chamber 78, the pressure differential across the clutch plate 66 can be controlled. The pressure in the torus flow cavity on the left hand side of the plate 66 will cause the friction surfaces on the cover 60 and on the clutch plate 66 to become frictionally engaged. During soft lockup, slipping will occur between the friction surfaces requiring fluid flow for cooling but during hard lockup fluid flow is undesirable. The present invention blocks fluid flow through the friction surfaces during hard lock up.

Referring to FIG. 2, the piston 63 has a face 67 that controllably engages the friction material 61. The piston face 67 has center portion 69 which is preferably flat, and a raised distal edge portion 71 facing toward and rising in the direction of the friction material. The distal edge portion begins at the intersection where its inner edge meets the center portion and extends toward the impeller housing 14 and the friction material at an angle between about ½° and about 1½°. At angles less than about ½°, the distal edge effectively engages the corresponding mating areas of the friction material uniformly. At angles greater than about 1½°, the distal edge engages the radially outermost portion of the friction material to soon before engaging other mating portions thereby applying piston pressure unevenly causing accelerated and uneven wear of the friction material. Within the range of about ½° to about 1½°, the outer edge of the distal edge portion timely engages the friction material before the inner edge engages the friction material providing controlled uneven contact without accelerated or uneven wear. A stiff piston as described herein is effective within the range specified, but a less stiff piston may extend the range somewhat although at the expense of increased leakage flow or increased pressure to compensate for less stiffness. As illustrated, the distal edge portion forms a ramp that is oriented away from vertical and the vertical piston face at the preferred angle of about ¾° which is within the range of about ½° to about 1½°.

Referring to FIG. 3, the friction material disk 61 has a series of concentric lands and grooves. There is an outermost land 80, an innermost land 82 and intermediate lands 84. Grooves 86 exist between the outermost land 80 and innermost land 82 as defined by adjacent lands. Preferably, there are four lands defining three concentric grooves. Outside of outermost land 80 is an outer groove area 88, and inside innermost land 82 is an inner groove area 90. The outer groove area 88 is connected to the three concentric grooves 86 by a series of radial grooves 92. Fluid may flow from outer groove area 88 through radial grooves 92 to concentric grooves 86 but is blocked from flowing to inner groove area 90 by innermost land 82.

During operation, the pressure in the torus flow cavity on the left hand side of the clutch plate 66 and piston 63 cause the friction surface on the piston 63 and the friction material 61 to frictionally engage. Engagement begins with the piston 63 moving toward friction material disk 61. Because the outer edge of distal end 71 of piston 63 is horizontally closer to the friction material disk 61 than the inner edge and central face portion 69 of piston 63, the outer edge contacts disk 61 first, followed by the remainder of the ramped distal end 71 and the central piston face 69. Because of its angle, the distal end 71 first contacts the outermost land 80 providing soft lockup friction. During this soft lockup, slipping will occur between the friction surfaces requiring fluid flow for cooling but during hard lockup fluid flow is undesirable. As piston movement continues, the intermediate lands are contacted by the piston providing greater lockup. At this time, there may be slippage which generates heat that is controlled by fluid flow from the outer groove area through the radially extending grooves to the concentric grooves. As illustrated, this fluid flow is from the torus flow cavity along a path through the radial grooves into the concentric grooves and over the innermost land. During this soft lockup condition, fluid from the torus flow cavity finds a leakage path between the innermost land and piston, but as piston movement continues toward the disk, contact is made with the innermost land blocking the leakage flow path producing a hard lockup condition. At hard lockup, the piston face contacts all of the lands for maximum frictional engagement. The piston and disk establish a friction driving connection between the impeller and turbine when the pressure differential across the clutch pate is sufficient to establish a clutch engaging force to produce hard lockup.

It can now be appreciated that a tapered piston for a lockup clutch for a torque converter has been presented. The clutch plate is connected via a damper to the hub of the turbine establishing a mechanical torque transfer between the engine crankshaft and the turbine bypassing the torque flow path through the torque converter. The tapered piston facilitates the desired hard lockup condition without leaking fluid because the innermost land on the friction disk is constructed without radial grooves that have heretofore allowed fluid flow during piston engagement with the disk. Controlled slippage is allowed because the piston face has a tapered portion that contacts the disk lands one at a time so that fluid can leak between the piston face and groove-free innermost land which enjoy a slight separation while the piston and outer lands are engaging.

The tapered piston is designed so that the pressure deflection of the piston acts as a valve to limit fluid flow through the grooves during hard lockup but still provide adequate cooling flow during shift modulation. In the past leakage flow during hard lockup varied with fluid pressure increasing linearly from about 1000 ml/min at 50 psi to about 1500 ml/min at 90 psi. With the present invention, tests indicate that leakage flow at 50 psi will be practically 0 ml/min and remain at that level as pressure increases to 90 psi.

While the invention has been described with reference to the preferred embodiments, it will be understood by those skilled in the art that various changes may be made and equivalents may be substituted for elements of the preferred embodiments without departing from invention. For example, while the invention has been described with friction material attached to the housing, it can be attached to the piston instead. And while the concentric grooves have been described as being in the friction material, the could be true with the grooves placed in the piston. Also, the piston could be flat and the disk angled. It is accordingly intended that the claims shall cover all such modifications and applications as do not depart from the true spirit and scope of the invention.

What is claimed is:

1. A lockup clutch for a torque converter, said torque converter having an impeller housing enclosing a turbine and impeller, said lockup clutch comprising:

a clutch plate, located in said housing, having one end portion connected to said turbine and a distal end portion forming a piston, said piston having a face with a friction surface and containing a center portion and an edge portion;

an annular friction disk attached to an interior portion of said housing, said clutch plate and said friction disk defining a control pressure chamber, said housing defining a torus circuit cavity; and a friction material on said annular friction disk for contacting said piston face, said friction material being arranged in a pattern of concentric lands defining annular grooves between adjacent lands with an innermost land being free of radial grooves and all other lands being connected by radial grooves communicating with said interior of said housing through said torus circuit cavity, said innermost land blocking fluid flow from said torus flow circuit cavity when said piston engages said disk in a hard lockup condition but permitting fluid flow during a soft lockup condition.

2. A lockup clutch, as set forth in claim 1, wherein said edge portion is raised from said center portion so that said edge portion tapers outward away from said center portion.

3. A lockup clutch, as set forth in claim 2, wherein said edge portion tapers outward away from said center portion at an angle in a range of about ½° to about 1½°.

4. A lockup clutch, as set forth in claim 2, wherein said edge portion tapers outward away from said center portion at an angle of about ¾°.

5. A lockup clutch for a torque converter, said torque converter having an impeller housing enclosing a turbine and impeller, said lockup clutch comprising:

a clutch plate, located in said housing, having one end portion connected to said turbine and a distal end portion forming a piston, said piston having a face with a friction surface, a center portion and a distal edge portion raised from said center portion so that said distal edge portion tapers outward away from said center portion;

an annular friction disk attached to an interior portion of said housing, said clutch plate and said friction disk defining a control pressure chamber, said housing defining a torus circuit cavity; and a friction material on said annular friction disk for contacting said piston face, said friction material being arranged in a pattern of concentric lands defining annular grooves between adjacent lands, an innermost land being free of radial grooves and all other lands being connected by radial grooves communicating with said interior of said housing through said torus circuit cavity, said innermost land preventing communication with said control pressure chamber when said piston locks up said disk.

6. A lockup clutch, as set forth in claim 5, wherein said distal edge portion tapers outward away from said center portion at an angle in a range of about ½° to about 1½°.

7. A lockup clutch, as set forth in claim 5, wherein said distal edge portion tapers outward away from said center portion at an angle of about ¾°.

8. A lockup clutch for a torque converter, said torque converter having an impeller housing enclosing a turbine and impeller, said lockup clutch comprising:

a clutch plate, located in said housing, having one end portion connected to said turbine and a distal end portion forming a piston, said piston having a tapered face with a friction surface;

an annular friction disk attached to an interior portion of said housing, said clutch plate and said friction disk defining a control pressure chamber, said housing defining a torus circuit cavity; and a friction material on said annular friction disk for contacting said piston face, said friction material being arranged in a pattern of concentric lands defining annular grooves between adjacent lands with an innermost land being free of radial grooves and all other lands being connected by radial grooves communicating with said interior of said housing through said torus circuit cavity, said innermost land blocking fluid flow from said torus flow circuit cavity when said piston engages said disk in a hard lockup condition but permitting fluid flow during a soft lockup condition.

9. A lockup clutch, as set forth in claim 8, wherein said tapered face tapers outward toward said disk at an angle in the range of about ½° to about 1½° so that said piston face engages said innermost land after said face engages said outermost land and said intermediate lands.

10. A lockup clutch, as set forth in claim 8, wherein said tapered face tapers outward toward said disk at an angle of about ¾° so that said piston face engages said innermost land after said face engages said outermost land and said intermediate lands.

* * * * *